US009344687B2

(12) United States Patent
Kozakura

(10) Patent No.: US 9,344,687 B2
(45) Date of Patent: May 17, 2016

(54) MONITORING CAMERA APPARATUS AND CONTROL METHOD FOR MONITORING CAMERA APPARATUS

(75) Inventor: Masato Kozakura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 404 days.

(21) Appl. No.: 13/268,227

(22) Filed: Oct. 7, 2011

(65) Prior Publication Data

US 2012/0092496 A1    Apr. 19, 2012

(30) Foreign Application Priority Data

Oct. 19, 2010  (JP) ................................. 2010-234880

(51) Int. Cl.
*H04N 7/18* (2006.01)
*G08B 13/196* (2006.01)
*H04N 5/232* (2006.01)

(52) U.S. Cl.
CPC .......... *H04N 7/188* (2013.01); *G08B 13/19656* (2013.01); *G08B 13/19686* (2013.01); *H04N 5/23206* (2013.01)

(58) Field of Classification Search
CPC ............... H04N 7/188; H04N 5/23206; G08B 13/19656
USPC .................. 348/143, 148, 222.1, 470, 231.8; 382/103; 709/217
See application file for complete search history.

(56) References Cited

U.S. PATENT DOCUMENTS

| | | | |
|---|---|---|---|
| 2003/0231257 A1* | 12/2003 | Ochiai et al. | 348/470 |
| 2007/0285512 A1* | 12/2007 | Kitani et al. | 348/148 |
| 2008/0036877 A1* | 2/2008 | Arima | 348/231.8 |
| 2008/0270569 A1* | 10/2008 | McBride et al. | 709/217 |
| 2009/0040302 A1* | 2/2009 | Thompson | 348/143 |
| 2009/0207269 A1* | 8/2009 | Yoda | 348/222.1 |
| 2009/0262987 A1* | 10/2009 | Ioffe et al. | 382/118 |
| 2009/0316955 A1* | 12/2009 | Takeuchi | 382/103 |
| 2010/0149330 A1* | 6/2010 | Salgar et al. | 348/143 |
| 2010/0208069 A1* | 8/2010 | Rezvani et al. | 348/143 |
| 2011/0025846 A1* | 2/2011 | Garrett | 348/143 |

FOREIGN PATENT DOCUMENTS

| | | |
|---|---|---|
| CN | 1520658 A | 8/2004 |
| CN | 1574891 A | 2/2005 |
| CN | 1750597 A | 3/2006 |
| JP | 2000-242566 A | 9/2000 |
| JP | 2003-046745 A | 2/2003 |
| JP | 2007-049235 A | 2/2007 |
| JP | 2007-243522 A | 9/2007 |
| JP | 2008-066893 A | 3/2008 |

* cited by examiner

*Primary Examiner* — Tung Vo
*Assistant Examiner* — Rowina Cattungal
(74) *Attorney, Agent, or Firm* — Canon U.S.A., Inc. IP Division

(57) ABSTRACT

A monitoring camera apparatus including a processing unit configured to process a video image input by an imaging unit, an upload control unit configured to upload the video image processed by the processing unit to a server via a network, a setting unit configured to set a parameter for the imaging unit to perform imaging or a processing parameter for the processing unit, and a transmission control unit configured to stop uploading of the processed video image to the server when the setting unit is in use.

28 Claims, 8 Drawing Sheets

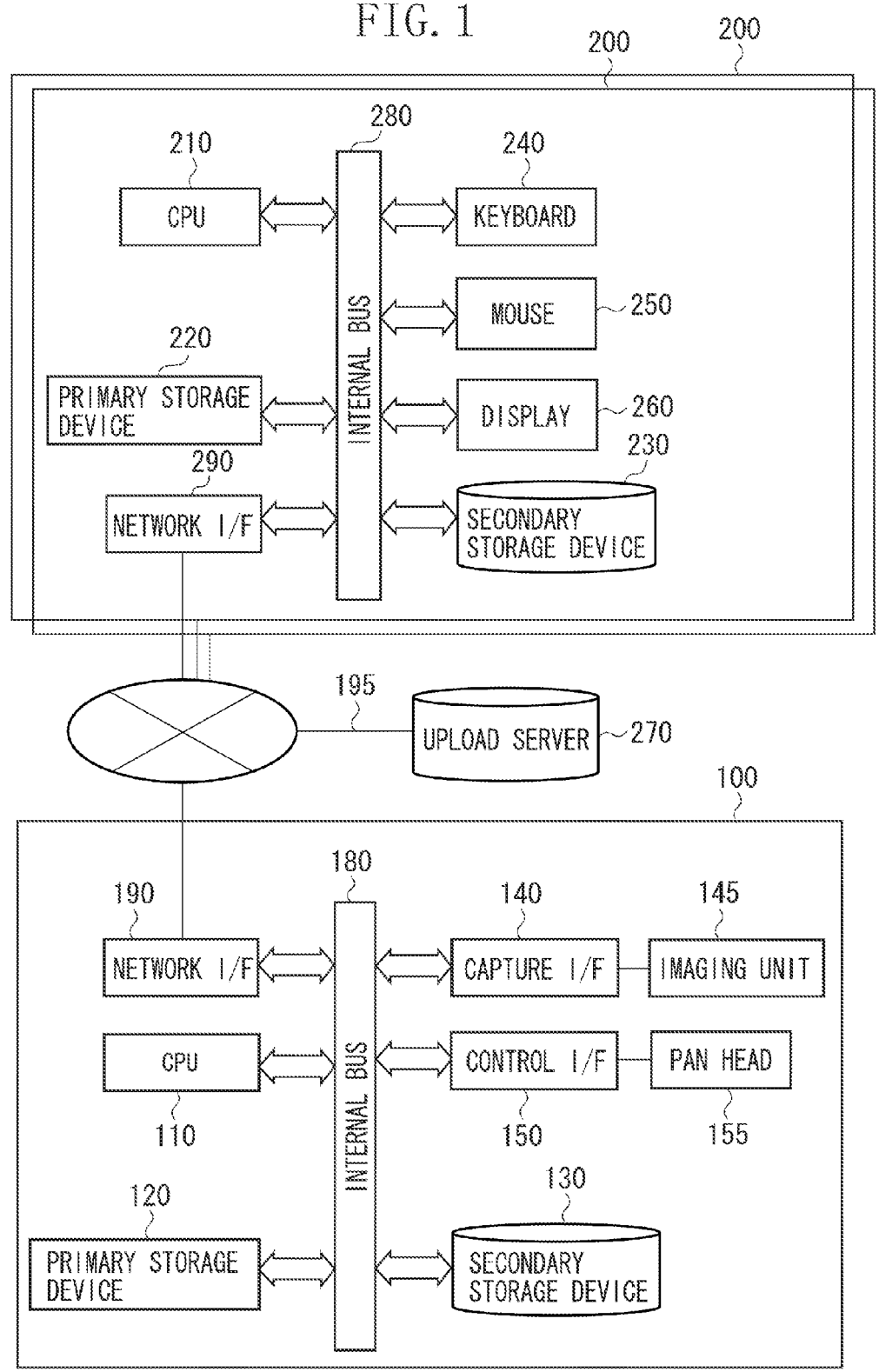

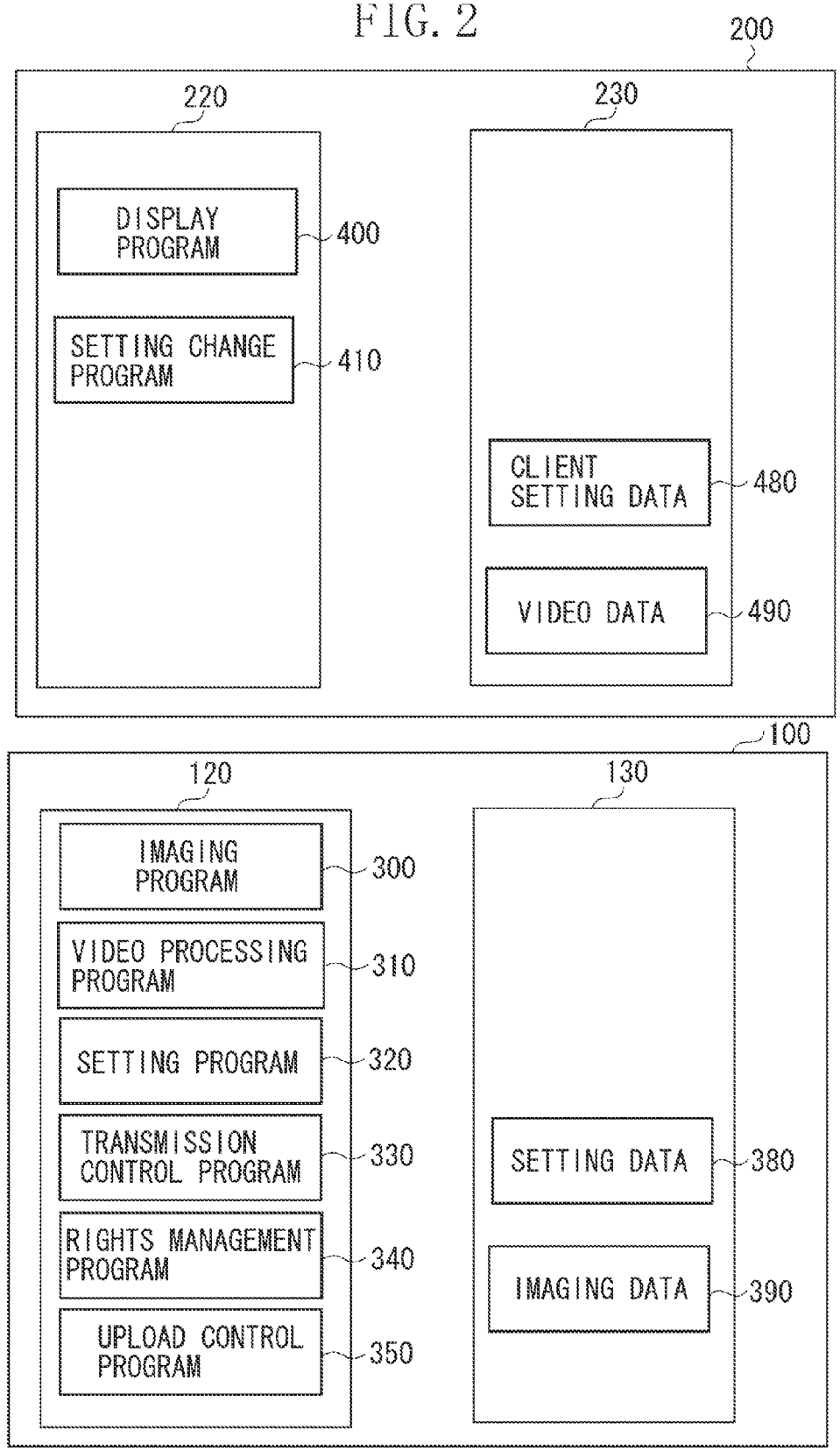

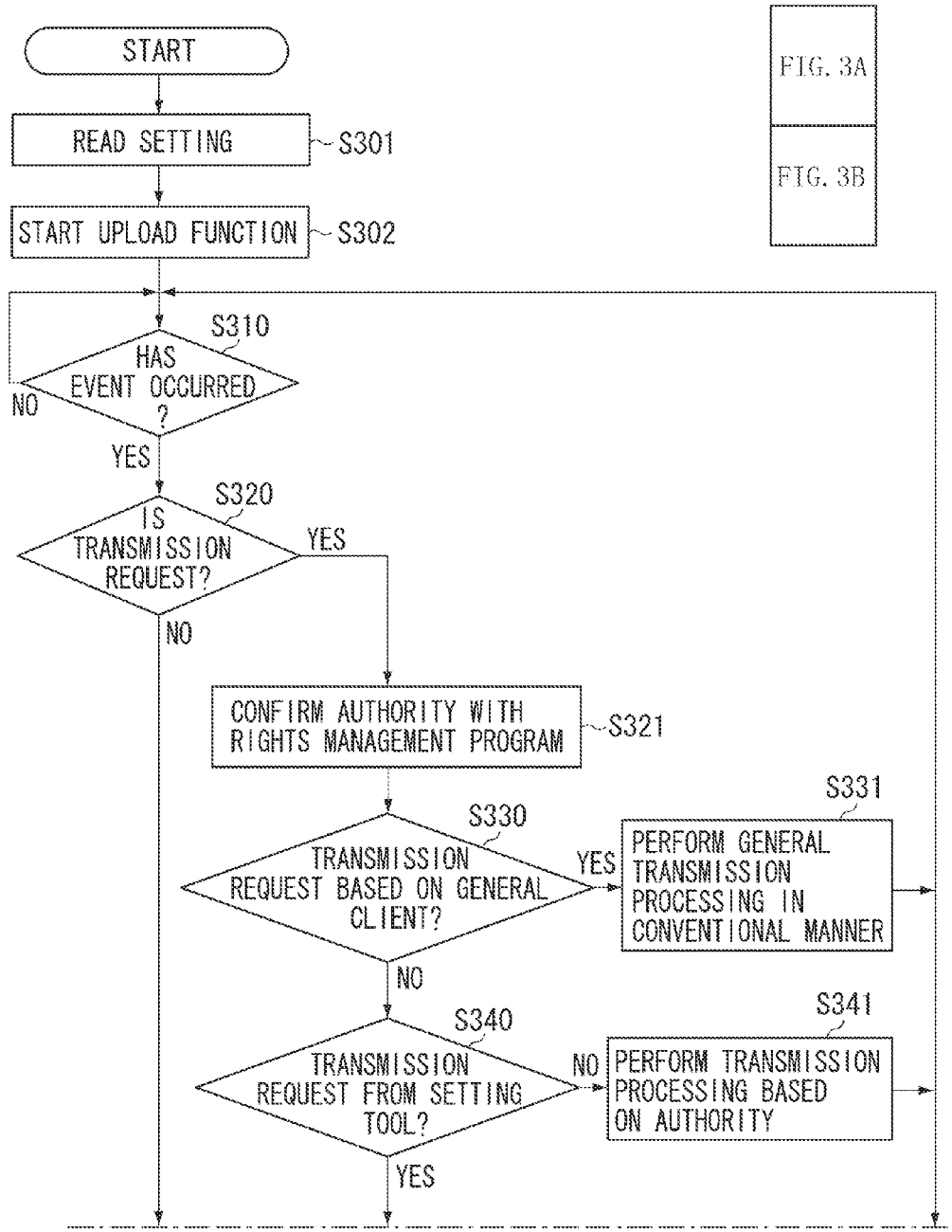

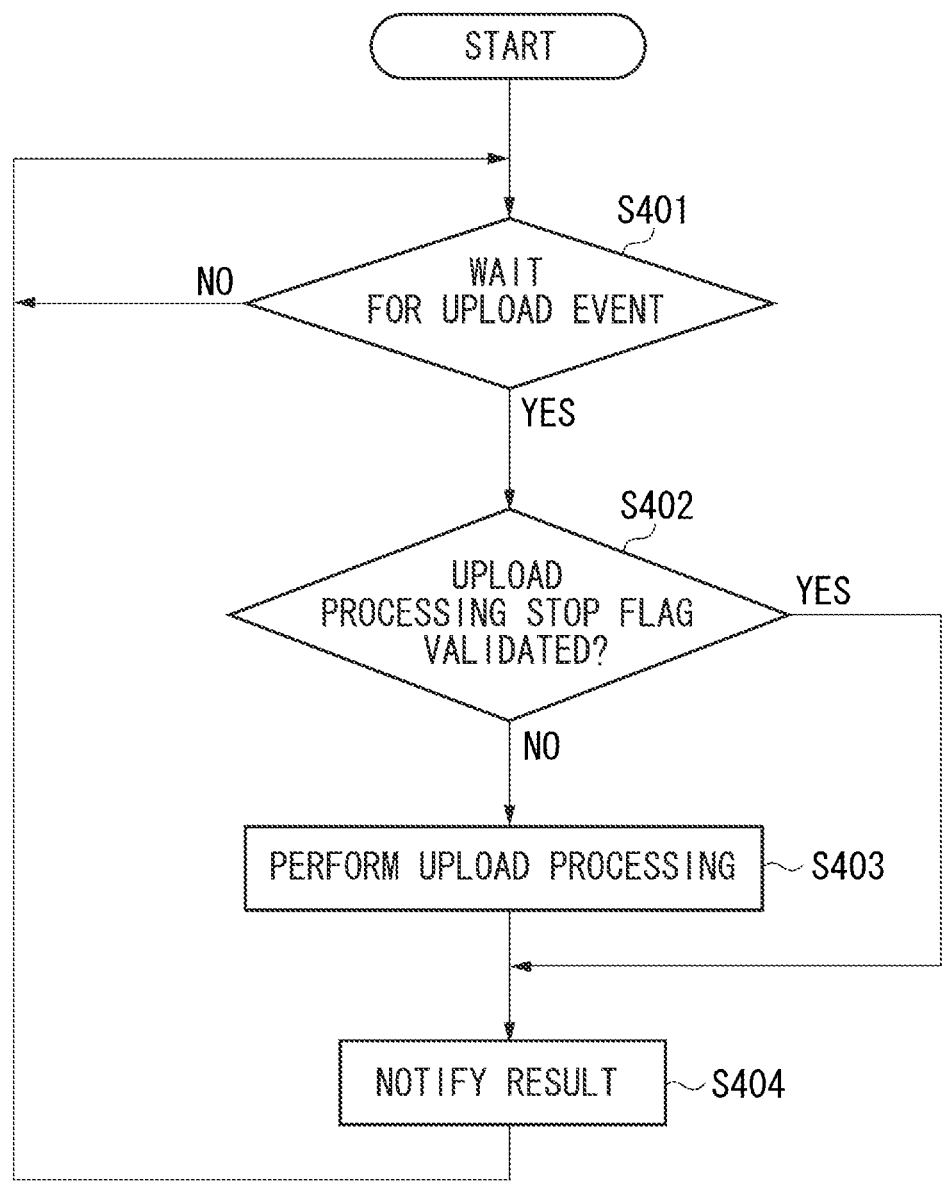

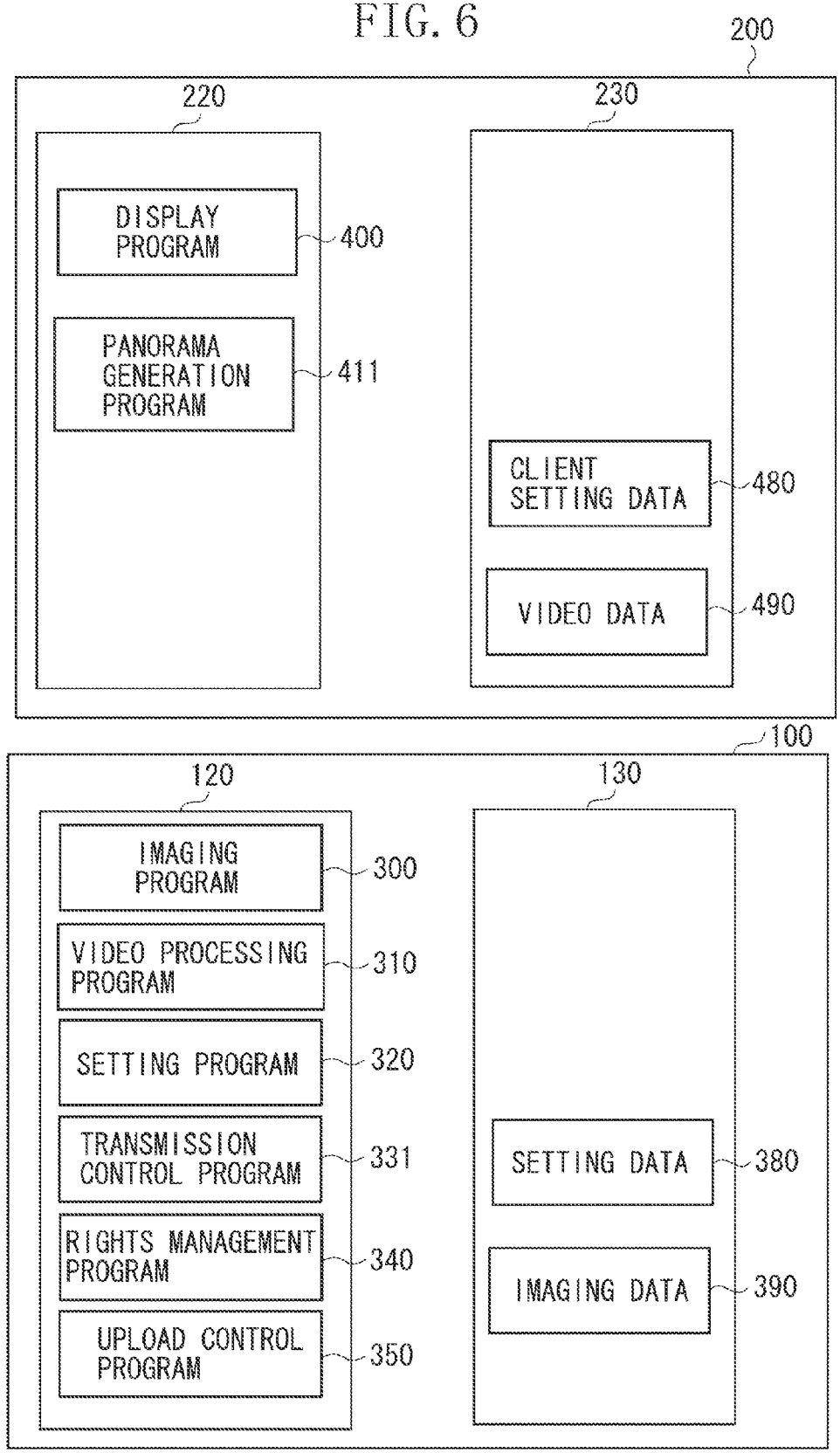

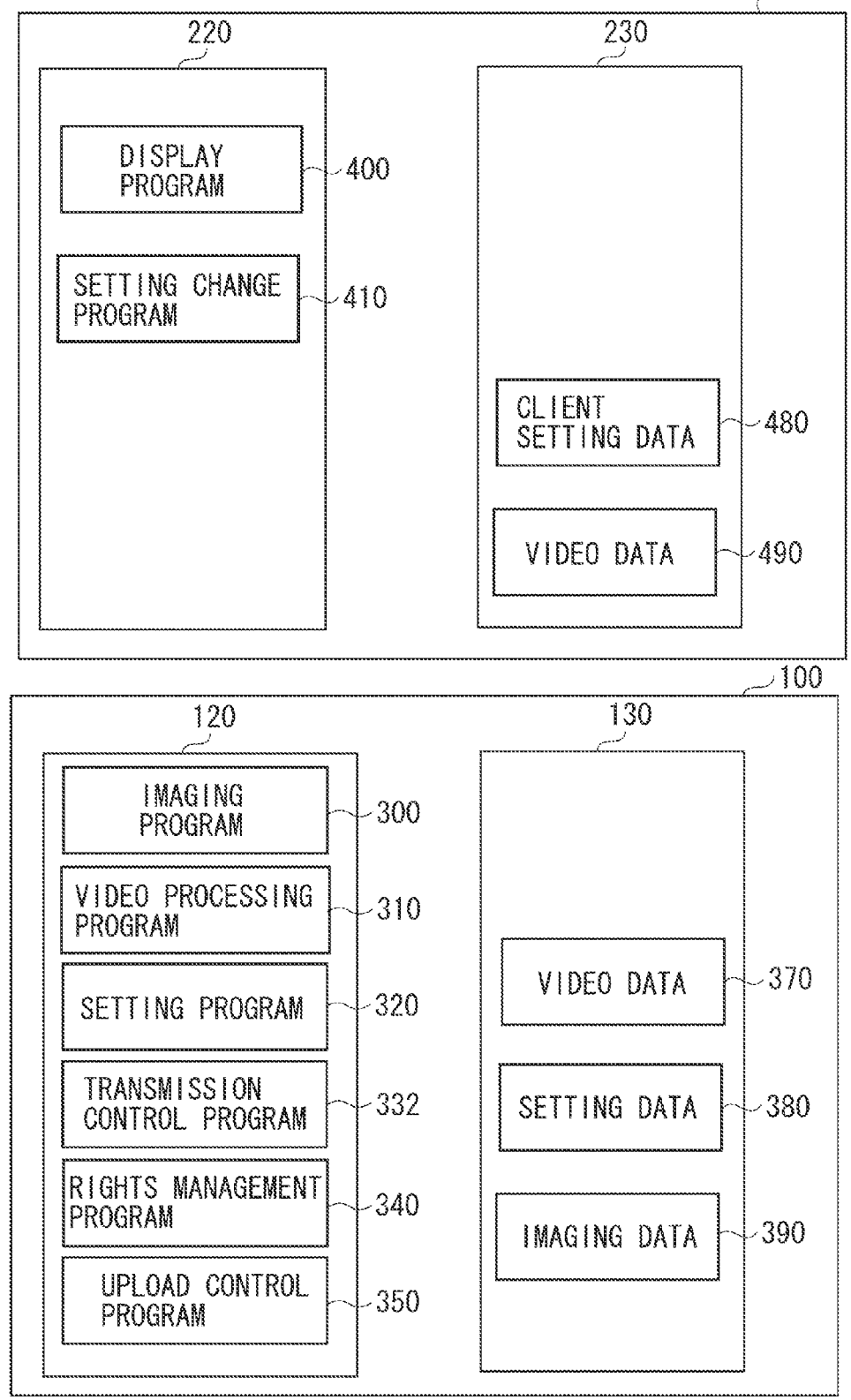

MONITORING CAMERA APPARATUS AND CONTROL METHOD FOR MONITORING CAMERA APPARATUS

BACKGROUND OF THE INVENTION

1. Field of the Invention

The present invention relates to a monitoring camera apparatus and a control method for the monitoring camera apparatus.

2. Description of the Related Art

Recently, network-compatible cameras are spreading into residential areas, shops, banks, train stations and the like for various applications, such as crime prevention and surveillance. On the other hand, to prevent privacy from being infringed such as by the leakage of personal information or confidential information in an imaging area, cameras have been developed that can set a mask area in the imaging area to protect privacy.

Similarly, cameras have been developed that can restrict the control of a camera by narrowing the control range of the camera, limiting the control to a present position, or preventing a general user from performing control at all.

Further, cameras have been developed that have a function for uploading a captured video to a server connected to a network using a plurality of network protocols, such as hyper text transfer protocol (HTTP), file transfer protocol (FTP), and simple mail transfer protocol (SMTP).

Conventionally, for a network camera having a pan/tilt mechanism, cameras that protect privacy by following and masking operations even while the camera is running, and changing and masking shapes during camera control have been known (e.g., Japanese Patent Application Laid-Open No. 2007-049235).

In addition, conventionally, a system has been known in which a stored video is processed and then retransmitted according to a user's authority (e.g., Japanese Patent Application Laid-Open No. 2000-242566). Moreover, conventionally, a system has been known which changes and outputs a privacy mask area according to the user (e.g., Japanese Patent Application Laid-Open No. 2003-046745).

However, in the conventional art, when an administrator sets a restriction on the control range or the imaging range of the camera and processes the video, the imaging area needs to be shown to the administrator in an unrestricted state. Consequently, the restrictions on camera control sometimes have to be lifted while the administrator has access.

For example, in order for the administrator to generate a panoramic image or to set panorama imaging, the administrator uses a video image that is free from a mask restriction that can only be seen by the administrator based on his/her privilege. In this case, a video image having a security issue whose mask restriction has been lifted may be uploaded to the server, where it can be seen by a general user.

This issue is not limited to only mask restriction. During restriction of camera control, such as a restriction on the imaging area or a preset position designation, the similar security issue of a video image having a lifted restriction being uploaded can occur.

SUMMARY OF THE INVENTION

The present invention is directed to a technique capable of preventing a video image which has not been set from being uploaded to a server during setting of a camera.

According to an aspect of the present invention, a monitoring camera apparatus includes a processing unit configured to process a video image input by an imaging unit, an upload control unit configured to upload the video image processed by the processing unit to a server via a network, a setting unit configured to set a parameter for the imaging unit to perform imaging or a processing parameter for the processing unit to process the video image, and a transmission control unit configured to stop uploading of the processed video image to the server if the setting unit is in use.

According to the present invention, a video image which should have restrictions on its public availability can be prevented from being uploaded. Especially, the occurrence of unintentional uploading when an administrator is performing a setting, such as a privacy mask or a visible range restriction, can be eliminated.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating an example of a system configuration according to a first exemplary embodiment.

FIG. 2 illustrates an example of various types of programs and data according to the first exemplary embodiment.

FIG. 4 is a flowchart illustrating processing performed by an upload control program.

FIG. 6 illustrates an example of various types of programs and data according to a second exemplary embodiment.

FIG. 7 illustrates an example of various types of programs and data according to a third exemplary embodiment.

DESCRIPTION OF THE EMBODIMENTS

Figure 3B:
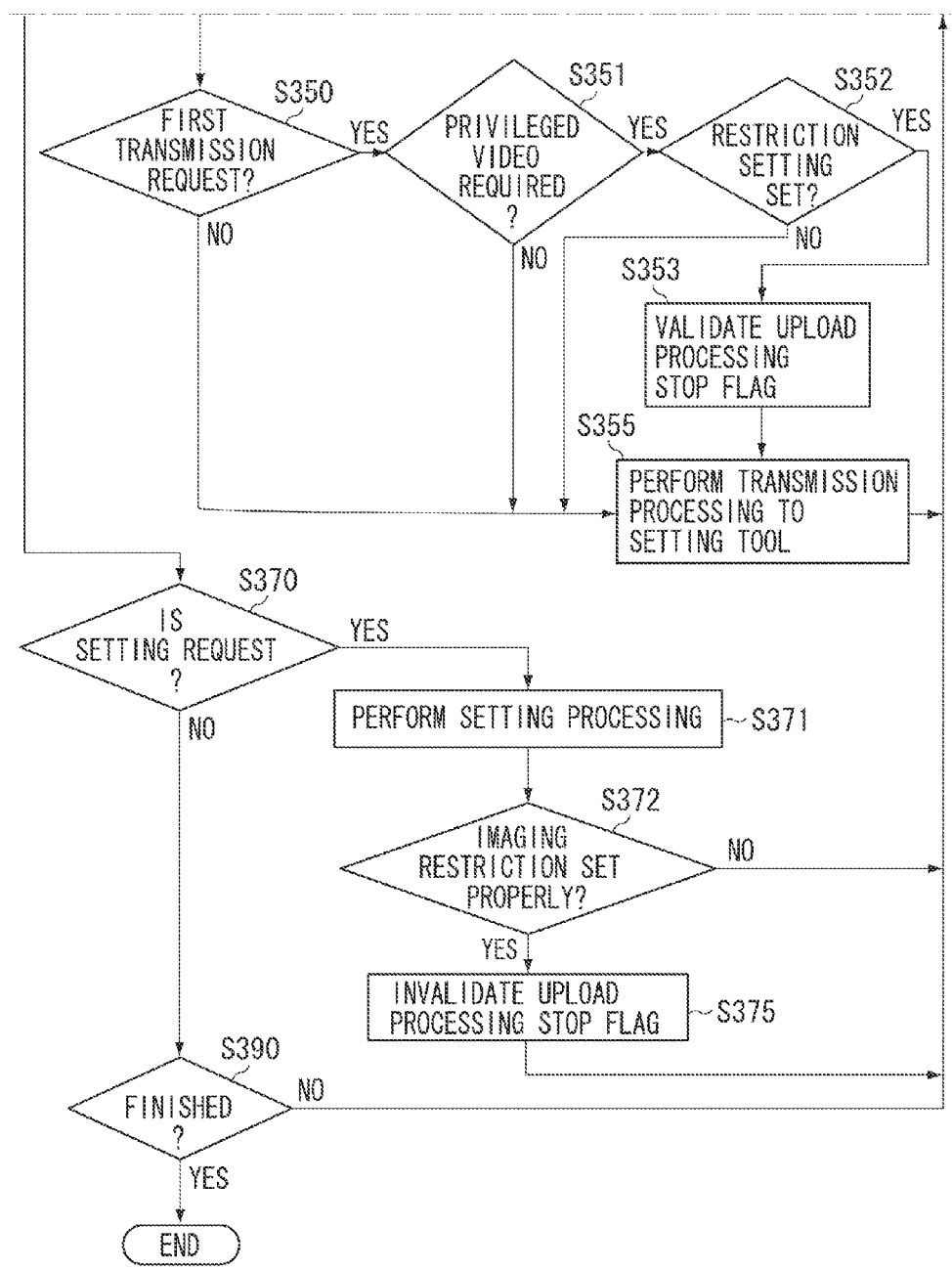
FIG. 3 (including FIG. 3A and FIG. 3B) is a flowchart illustrating processing performed by a transmission control program.

Various exemplary embodiments, features, and aspects of the invention will be described in detail below with reference to the drawings.

A first exemplary embodiment according to the present invention is described in detail below.

FIG. 1 is a block diagram illustrating in detail a camera server 100 and a client 200 that configure a monitoring camera system according to the present exemplary embodiment. In FIG. 1, a plurality of clients 200 is connected to the camera server 100 via a network 195.

A plurality of camera servers 100 is connected to an upload server 270 via the network 195. The camera server 100 uploads a video image to the upload server 270 when an upload event occurs. When setting the camera server after the camera server 100 has transmitted a video image obtained based on its privilege to the client 200, the camera server 100 temporarily stops uploading to the upload server 270.

A central processing unit (CPU) 110, a primary storage device 120, a secondary storage device 130, a video capture interface (I/F) 140, a pan/tilt/rotation control I/F 150, and a network I/F 190 are connected to each other via an internal bus 180.

The primary storage device 120 is a writable high-speed storage device represented by a random access memory (RAM), into which an operating system (OS), various programs, and various types of data are loaded. The primary storage device 120 is also used as a work area for the OS and the various programs. A primary storage device 220 in the below-described viewer client (client) 200 is also the same.

The secondary storage device 130 is a nonvolatile storage device, such as a flexible disk, a hard disk drive (HDD), a flash memory, or a compact disk read only memory (CD-ROM) drive. As well as being used as a permanent storage area for the OS, the various programs, and the various types of data, the secondary storage device 130 is also used as a temporary storage area for various types of data. A secondary storage device 230 in the client 200 is also the same.

The video capture I/F 140 is connected to an imaging unit 145. The video capture I/F 140 converts and compresses image data captured by the imaging unit 145 into a predetermined format, and transfers the processed image data to the primary storage device 120. The control I/F 150 is connected to a pan head 155. The control I/F 150 obtains the state of a pan mechanism, a tilt mechanism, and a rotation mechanism in the pan head 155. In addition, the control I/F 150 controls the pan head 155 based on an instruction.

The network I/F 190 is an I/F for connecting to the network 195. The network I/F 190 is used to communicate with the respective clients or network servers via a communication medium such as Ethernet (registered trademark).

The network 195 is configured from a plurality of routers, switches, cables and the like that satisfy a communication standard such as Ethernet. In the present exemplary embodiment, any communication standard, size, and configuration may be employed, as long as communication between the servers and clients is not hindered. Therefore, anything from the Internet to a local area network (LAN) may be employed as the network 195.

In the client 200, a CPU 210, the primary storage device 220, the secondary storage device 230, a keyboard 240, a mouse 250, a display 260, and a network I/F 290 are connected to each other via an internal bus 280. A general input device for giving instructions is connected to the keyboard 240 and the mouse 250. A general output device for performing display is connected to the display 260.

FIG. 2 schematically illustrates the primary storage devices 120 and 220 and the secondary storage devices 130 and 230 in the camera server 100 and the client 200, respectively.

The primary storage device 120 in the camera server 100 is loaded with an imaging program 300, a video processing program 310, a setting program 320, a transmission control program 330, a rights management program 340, an upload control program 350, and the like.

The secondary storage device 130 in the camera server 100 stores setting data 380, imaging data 390, and the like. The primary storage device 220 in the client 200 is loaded with a display program 400, a setting change program 410, and the like. The secondary storage device 230 in the client 200 stores setting data 480, video data 490, and the like.

As illustrated in FIG. 1, the entire system according to the present exemplary embodiment is configured with the camera server 100 connected to a plurality of clients 200 via the network 195. The camera server 100 is operated via the network 195 based on instructions from the general input device, such as the keyboard 240 or a mouse 250 arranged in the client 200. This configuration is also realized in conventional network cameras.

In the system according to the present exemplary embodiment, when a specific client 200 performs setting after having transmitted a video image obtained based on its privilege, the uploading function is temporarily stopped. This function will be described below.

First, the imaging program 300, the video processing program 310, the setting program 320, the transmission control program 330, the rights management program 340, and the upload control program 350 in the camera server 100 will be described.

The imaging program 300 receives an instruction from the transmission control program 330, and activates the pan head 155 via the control I/F 150. Further, the imaging program 300 processes a video image from the imaging unit 145 with the video capture I/F 140, and stores the imaging data 390 in the secondary storage device 130. The storage destination is not limited to the secondary storage device 130. For example, the storage destination may be a high-speed storage device like the primary storage device 120 or a buffer. This processing is general processing performed by a network camera which receives an instruction and performs imaging with the camera by driving the pan/tilt mechanism.

Before the imaging data 390 is stored in the secondary storage device 130, the video image may first be processed by the video processing program 310, which is called based on position information from the control I/F 150 or the setting data 380, for example, and then stored as the imaging data 390. The video processing program 310 is described below.

The video processing program 310 realizes video processing, such as conventional privacy mask processing, by receiving an instruction from the transmission control program 330. The video processing program 310 is also realized by cameras having a privacy masking function, which are also in the conventional art.

With respect to a parameter of the imaging program 300, and a processing parameter of the video processing program 310, the setting program 320 issues various setting change events based on an instruction from the client 200 and a program (e.g., the transmission control program 330).

The parameter of the imaging program 300 may be, for example, an imaging direction of the imaging unit 145. The parameter of the video processing program 310 may be, for example, a privacy mask position. These parameters are stored in the setting data 380. This processing is general setting processing that is performed by a conventional network camera.

The transmission control program 330 obtains the imaging data 390 by issuing an event to the imaging program 300, and processes the imaging data 390 by issuing an event to the video processing program 310.

Further, the transmission control program 330 transmits and receives various events, transmits the video image of the processed imaging data 390, controls and disconnects transmission, and transmits a specific video image. In other words, the transmission control program 330 controls transmission to the client 200. The processing performed by the transmission control program 330 will be described in more detail below.

The rights management program 340 is called from the transmission control program 330, for example, and controls access to the camera by returning the presence of an access right or a video processing unit according to an authority as a response. The processing by the rights management program 340 is general access management processing that is conventionally performed.

The upload control program 350 receives the various events that act as an upload trigger, and uploads video data obtained from the video processing program 310 to the server connected to the network. The uploading may be realized based on an arbitrary Internet protocol. Examples of representative data transfer protocols include FTP, HTTP, and SMTP.

Next, the display program 400 and the setting change program 410 in the client 200 will be described.

The display program 400 makes a transmission request to the camera server 100 from the client 200, and displays the acquired video data on the display 260. This processing is a technique that is realized by a conventional network camera.

The setting change program 410 changes the setting data 380 by making a setting request to the camera server 100 based on an instruction from the general input device, such as the keyboard 240 or the mouse 250, in the client 200.

The setting change program 410 is installed in a privileged client having privileges, and is started by a below-described setting tool. These programs may perform processing simultaneously in parallel, more specifically, the user can change the setting while viewing the display.

Next, a control procedure of the transmission control program 330 will be described with reference to the flowchart in FIG. 3. The processing illustrated in the flowchart in FIG. 3 is realized by the CPU 110 executing the transmission control program 330.

In step S301, the transmission control program 330 first reads the setting data 380. Then, in step S302, the transmission control program 330 starts the upload function.

In step S310, the transmission control program 330 waits for an event. If an event occurs (YES in step S310), the processing proceeds to step S320.

In step S320, the transmission control program 330 determines whether the event is a video image transmission request to the client. If the event is the video image transmission request to the client (YES in step S320), the processing proceeds to step S321. Then, in step S321, the transmission control program 330 makes an inquiry to the rights management program 340, and obtains the necessary authority information.

In step S330, the transmission control program 330 determines whether the video transmission request is based on a general client authority. If the transmission control program 330 determines that the video transmission request is based on the general client authority (YES in step S330), the processing proceeds to step S331. In step S331, the transmission control program 330 performs transmission processing to the general client in the conventional manner.

For example, the transmission control program 330 issues an event to the imaging program 300. At that time, according to the setting data 380, as the transmission processing to the general client, a video image is captured under the restriction of control of the pan head 155 via the control I/F 150.

Further, the transmission control program 330 issues an event to the video processing program 310 and transmits the imaging data 390, on which video processing such as a privacy mask has been performed, to the client 200. Then, the processing returns to step S310, and the transmission control program 330 waits for an event.

On the other hand, if it is determined in step S330 that the video transmission request is not based on the general client authority (NO in step S330), the processing proceeds to step S340. In step S340, the transmission control program 330 determines whether the transmission request is from the setting tool. A case in which the video transmission request is not based on the general client authority occurs when the transmission request is from the privileged client having privileges.

When receiving the transmission request from the camera server 100, the privileged client can use an administrator viewer to receive a video image that is not subject to restrictions based on a mask setting, a visible range setting, a preset position setting, an installation pan, tilt, and rotation (PTR) setting and the like.

The installation PTR setting is a setting that sets the imaging direction of the imaging unit 145 by operating the pan mechanism, the tilt mechanism, or the rotation mechanism during the installation of the camera server 100.

The setting tool is a setting application for changing the settings in the camera server 100. The privileged client can change a setting in the camera server 100 by starting the setting change program 410 based on operation of the setting tool and making a setting request to the camera server 100.

The privileged client can use the setting tool to set in the general client the restriction on viewing of a part of the video image input by the imaging unit 145, and set in the camera server 100 the restriction on the imaging range that can be captured by the imaging unit 145.

For example, the privileged client can use the setting tool to change settings, such as the mask setting, the visible range setting, the preset position setting, and the installation PTR setting, in the camera server 100.

These settings are merely an example of the setting contents. The contents that can be set by the setting tool are not limited to the above-described examples. For example, if the camera server 100 has a function for detecting a change in a captured video image, the setting tool can set the position and size of the detection area for detecting the change, detection conditions, and the like. Further, it is not necessary for the setting tool to be capable of setting all of the above-described setting contents.

The general client cannot use the setting tool. If the transmission request is not from the setting tool (NO in step S340), the processing proceeds to step S341. In step S341, the transmission control program 330 performs transmission processing according to the authority in the conventional manner.

More specifically, when the transmission request is from the privileged client and is not a setting change request to the camera server 100, the video image is transmitted according to the viewing authority of the privileged client. The difference with the transmission processing to the general client performed in step S331 is that the transmission is performed without restricting the control according to the authority.

In a system configured so that a video image restricted from general users is strictly prevented from being transmitted to the general client, the transmission control program 330 can perform the processing similar to that in the below-described step S355, and validate a stop flag for an upload function to the server.

Although this is described in more detail below, the upload function is temporarily stopped by validating the stop flag, so that the video image can be completely prevented from being uploaded while an operation is being performed based on privileges. Subsequently, the processing returns to step S310, and the transmission control program 330 waits for an event.

If it is determined in step S340 that the transmission request is from the setting tool (YES in step S340), the processing proceeds to step S350. In step S350, the transmission control program 330 determines whether the transmission request is a first video transmission request to the setting tool. If it is determined that the transmission request is the first video transmission request (YES in step S350), the processing proceeds to step S351. In step S351, the transmission control program 330 determines whether a privileged video image is required.

A case in which the privileged video image is required occurs when the contents set by the setting tool include a setting for restricting viewing of a part of the video image input by the imaging unit 145 or a setting for restricting the imaging range that can be captured by the imaging unit 145. For example, the transmission control program 330 determines whether the privileged video image is required when the contents set by the setting tool are the privacy mask setting or the visible range restriction setting.

On the other hand, a case in which the privileged video image is not required occurs when the contents set by the setting tool does not include a setting for restricting viewing of a part of the video image input by the imaging unit 145 or a setting for restricting the imaging range that can be captured by the imaging unit 145.

For example, if the camera server 100 has a function for detecting a change in a captured video image and the setting tool sets the position and size of the detection area for detecting the change, detection conditions, and the like, the transmission control program 330 determines that the privileged video image is not required.

If it is determined in step S351 that the setting tool requires a video image whose privilege is not restricted in order to perform the setting (YES in step S351), the processing proceeds to step S352. In step S352, the transmission control program 330 determines whether the restriction, such as the privacy mask or the visible range restriction, on viewing a part of the video image input by the imaging unit 145 is already set, or whether the restriction on the imaging range of the imaging unit 145 is already set.

If the contents set by the setting tool include the setting for restricting viewing of a part of the captured video image or the setting for restricting the imaging range that can be captured by the imaging unit 145, but are currently not set in that manner (NO in step S352), the processing proceeds to step S355.

For all cases in which the setting tool is connected, more specifically, in systems that do not upload to the server regardless of whether there is the privileged video image or not, the processing may unconditionally proceed to the below-described step S353. By doing so, uploading can be completely prevented while the setting tool is connected.

If it is determined in step S352 that the restriction, such as the privacy mask or the visible range restriction, on a part of the view for the general client is already set (YES in step S352), the processing proceeds to step S353.

In systems that, regardless of the setting, unconditionally stop uploading to the server when setting a restriction on imaging for the general client, the processing may automatically proceed to step S353. By doing so, when the privileged video image is transmitted to the setting tool, image uploading can be completely prevented during the setting with the setting tool.

In step S353, the transmission control program 330 validates the stop flag for the upload processing to the server. When the stop flag is valid, the upload processing to the server is temporarily stopped even if the uploading function is started in step S302.

If it is determined that the transmission request is a second or subsequent video transmission request made by the privileged client having an administrator authority (NO in step S350), or if it is determined that a video image based on the administrator authority is not required (NO in step S351), or if the restriction on viewing of the captured image is not valid (NO in step S352), the processing proceeds to step S355. In step S355, the transmission control program 330 performs transmission of the video image to the setting tool.

A case in which the restriction on viewing of the captured image is not valid occurs, for example, when the setting such as the mask setting, the visible range setting, and the installation PTR setting is currently not set. Further, such a case would also occur if the general client can view a captured image from positions other than the preset position even though a preset position has been set.

After step S353, the processing proceeds to step S355. In step S355, the transmission control program 330 transmits the video image to the setting tool. The video transmission processing is performed in the similar manner to that in step S341, according to the authority as in the conventional manner. Then, the processing returns to step S310, and the transmission control program 330 waits for an event.

If it is determined in step S320 that the event is not a transmission request (NO in step S320), the processing proceeds to step S370. Then, in step S370, the transmission control program 330 determines whether the event is a setting request. If it is determined that the event is the setting request (YES in step S370), the processing proceeds to step S371. In step S371, processing is performed by the setting program 320. For example, the setting data 380 is changed based on processing by the setting change program 410 in the client 200.

Next, in step S372, the transmission control program 330 determines whether an item to be set that is recorded in the setting data 380 in step S371 is a setting for restricting the view of the general client, and whether that setting is validated.

More specifically, when a new setting is applied (YES in step S372), the processing proceeds to step S375. In step S375, the transmission control program 330 invalidates the stop flag for the upload processing to the server. When the stop flag is invalid, the upload processing to the server is restarted. If the setting for restricting the recorded video image has not be validated (NO in step S372), or if the processing performed in step S375 has finished, the processing returns to step S310, and the transmission control program 330 waits for an event.

Next, a processing procedure of the upload control program 350 will be described with reference to the flowchart illustrated in FIG. 4.

In step S401, the upload control program 350 waits for an event that will act as a trigger for uploading. Examples of events that act as a trigger for uploading include a timer event generated every set predetermined time, and an external input event that is input from an external device connected to the camera server 100.

Further, if the camera server 100 can detect an object in a captured video image, for example, an event in which a change in the object is detected may also act as the trigger for uploading. In this case, for example, when the camera server 100 comes into a detected state, when the detected state is ended, or the duration that detection continues may be set as the uploading trigger event.

Alternatively, if the camera server 100 can detect a sound volume, a sound volume detection event may act as the trigger for uploading. In this case, for example, situations in which the sound volume is a predetermined level or greater, the sound volume is a predetermined level or less, or a predetermined sound volume continues for a predetermined duration or longer may be set as the uploading trigger event.

If the event that will act as the trigger for uploading occurs (YES in step S401), then in step S402, the upload control program 350 refers to the flag indicating a stop of the upload processing described in FIG. 3.

If the flag indicates the stop of the upload processing (YES in step S402), the processing skips step S403 and proceeds directly to step S404. In step S404, when the upload processing is stopped, the upload control program 350 notifies the upload server 270 of the reason why the upload processing is stopped. Then, the processing returns to step S401, and the upload control program 350 waits for a next event.

Sending the reason for stopping the upload processing to the upload server 270 allows a user who intends to view a video image uploaded to the upload server 270 to know why the video image is not uploaded.

If it is determined in step S402 that the flag does not indicate the stop of the upload processing (NO in step S402), the processing proceeds to step S403. In step S403, the upload control program 350 performs upload processing. Then, in step S404, the upload control program 350 notifies the user of that fact. The processing then returns to step S401.

The "upload processing" is processing in which video data captured by the camera server 100 and processed by the video processing program 310 is transferred to the upload server 270 and stored there. The upload processing can be realized using an arbitrary network protocol, as long as the data to be uploaded can be transferred. In HTTP, the video data and an arbitrary message can be transmitted to the server using a POST method.

Next, a configuration example of the entire system will be described with reference to FIG. 5.

The plurality of clients 200, in the form of a first client 200-1 and a second client 200-2, is connected to the camera server 100 via the network 195. Similarly, a plurality of upload servers 270, in the form of an upload server 270-1 and an upload server 270-2, is connected to the camera server 100 via the network 195.

For example, the first client 200-1 (setting tool 200-1) is a client that includes the display program 400 and the setting change program 410, and has a setting authority. Further, if the second client 200-2 is a viewer client with a general authority that only has the display program 400, the setting tool according to the present exemplary embodiment is the first client 200-1. A video image from the camera server 100 is displayed on the general client 200-2.

If the first client 200-1 requests transmission, the transmission control program 330 in the camera server 100 proceeds through step S340 to steps S350 and S351 illustrated in FIG. 3. If the first client 200-1 requires a video image with an unrestricted view based on privileges, the processing proceeds to step S352. However, if a setting for restricting the view is already valid, the processing proceeds to step S353.

Next, when an upload request is issued, the camera server 100 uploads the video data processed by the video processing program 310 to the upload server 270. The upload can be realized using an arbitrary network protocol, as long as the data can be transferred. In HTTP, the video data and an arbitrary message can be transmitted to the server using a POST method.

For example, if the upload processing flag indicates that the processing be temporarily stopped, by not transmitting the video data to the server but transmitting only a message portion notifying that fact allows the user to be notified of the reason why the video is not uploaded. Similarly, for FTP, the user can be notified of the reason why the video is not uploaded by uploading a text that includes a message instead of the video image.

In SMTP, arbitrary data, such as text and video data, can be included in a message body as a protocol specification. Therefore, the user can be notified of the reason why the video is not uploaded by transmitting a message without any video data that describes only the reason why the video is not uploaded.

Further, when a plurality of uploads is performed to the server connected to the network by utilizing a plurality of protocols, it is possible to stop only a specific protocol.

Figure 5:
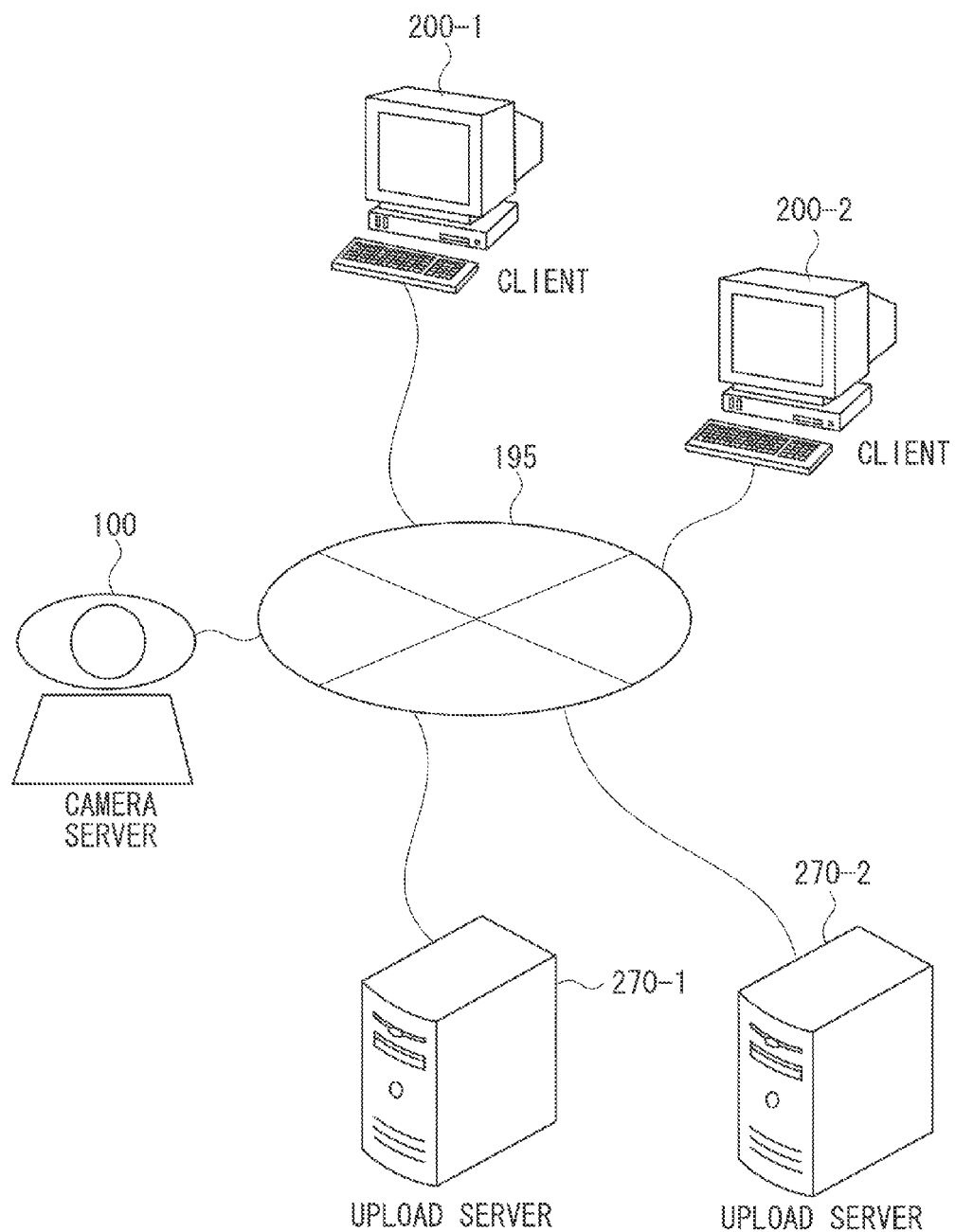
FIG. 5 illustrates a configuration example of the entire system.

For example, in FIG. 5, it will be assumed that the upload server 270-1 is a FTP server, the upload server 270-2 is a SMTP server, the camera server 100 upload setting is valid, and the upload processing has been stopped. In such a case, it is possible to stop the upload based on the FTP of the upload server 270-1, and transmit only a message based on the SMTP of the upload server 270-2.

When the stop flag for the upload processing is validated in step S353, the fact that setting values of the second client 200-2, for example, the privacy mask setting, the visible range setting, the preset limitation setting, and the installation setting, have been invalidated is recorded in the secondary storage device 130. This information is used for the determination in steps S371 and S372 regarding whether a setting that restricts imaging is validated.

In the present exemplary embodiment, preset limitation processing is performed which limits a movable position to a preset position. Further, in the present exemplary embodiment, angle of view setting processing is performed for setting the angle of view based on a control instruction for the angle of view of the imaging unit 145 by the client 200, which has the authority to change the settings. In this manner the setting for restricting the imaging range that can be captured by the imaging unit 145 is set. Further, panorama setting processing is performed for compositing and recording a panoramic image utilizing video images whose privacy mask is invalid based on privileges.

More specifically, if it was determined in step S370 that the event is a setting request event and setting processing is performed in step S371, then in step S372, the transmission control program 330 determines whether the setting is performed on the above-described setting that has been invalidated. The fact that these settings are validated in step S375 is recorded in the secondary storage device 130.

On the other hand, if it is determined in step S370 that the event is not the setting request event (NO in step S370), in step S390, the transmission control program 330 determines whether to finish the processing. If it is determined not to finish processing (NO in step S390), the processing returns to step S310.

By performing the processing in this manner, the upload processing to the server can be temporarily stopped while the setting tool is in use, so that the video image can be prevented from being uploaded based on the privilege of the administrator using the setting tool. Further, when setting is finished, the upload processing to the server is restarted.

In the above-described first exemplary embodiment, as illustrated in FIG. 5, the upload function is stopped when the setting tool is connected. However, in addition to when the setting tool is in use, the upload processing can also be stopped when it is necessary to lift a viewing restriction.

The configuration of the system according to a second exemplary embodiment is similar to that illustrated in FIGS. 1 to 5 according to the first exemplary embodiment. However, as illustrated in FIG. 6, the transmission control program 330 arranged in the primary storage devices 120 and 220 illustrated in FIG. 2 is changed to a transmission control program 331, and the processing contents are different. Further, another difference is that the setting change program 410 is replaced with a panorama generation program 411.

The panorama generation program 411 makes a transmission request to the camera server 100 to generate a panoramic image based on an instruction from the general input device, such as the keyboard 240 or the mouse 250 arranged in the client 200. Subsequently, the panorama generation program 411 sequentially obtains the necessary video data 490, composites the panoramic image, and generates the client setting data 480. Then, the panorama generation program 411 sets a new panoramic image in the camera server 100 with the data.

The flowchart illustrating processing executed by the transmission control program 331 according to the second exemplary embodiment is similar to the flowchart illustrated in FIG. 3 executed by the transmission control program 330 according to the first exemplary embodiment, except that a panorama generation tool is added to the setting tool in the determination processing performed in step S340.

If the view is restricted, the panorama generation tool may not be able to correctly generate the panorama. Therefore, it is necessary to capture an image of a whole controllable range without restricting the view. More specifically, since it is necessary for the image capturing to ignore settings for restricting the valid view, such as the privacy mask setting and the visible range restriction processing, and the preset limitation and control restrictions, it is necessary to stop the upload processing by performing processing similar to that in step S353.

When the panorama generation program 411 tries to composite a new panoramic image and perform setting in the camera server 100, the panorama generation program 411 can restart the upload processing by determining whether the new panoramic image is validated based on the processing similar to that in step S372.

By performing the processing in this manner, in the present exemplary embodiment, the upload processing to the server can be stopped while the panorama generation tool is being operated by ignoring settings that restrict the view, so that the video image can be prevented from being uploaded based on the privilege of the administrator using the panorama generation tool. Further, when the new panoramic image is validated, the upload processing can be restarted.

In the first and second exemplary embodiments, the upload processing is temporarily stopped. However, the present invention is not limited to this configuration. In a third exemplary embodiment, imaging data that has a security issue is prevented from being uploaded by uploading specific video data 370 to the server.

The configuration of the system according to the present exemplary embodiment is similar to that illustrated in FIGS. 1 to 5 in the first exemplary embodiment. However, as illustrated in FIG. 7, the transmission control program 330 arranged in the primary storage devices 120 and 220 illustrated in FIG. 2 is changed to a transmission control program 332, and the processing contents are different. Further, video data 370 is added to the secondary storage device 130 illustrated in FIG. 2.

The flowchart illustrating processing executed by the transmission control program 332 is similar to the flowchart illustrated in FIG. 3 executed by the transmission control program 330 according to the first exemplary embodiment, except that the processing performed in steps S331, S341, S353, and S375 is changed.

In the step similar to step S331 in FIG. 3, the transmission control program 332 performs transmission processing to the general client in the conventional manner. At that time, in the step similar to step S353, which is described below, if the video data 370 rather than the imaging data 390 is validated for the relevant authority, the video data 370 prepared in advance is transmitted to the general client, not the imaging data 390. When the upload control program 350 receives an upload execution event in step S401, similar to the image transmitted to the general client, the data to be uploaded in step S403 is also the video data 370.

In the step similar to step S341 in FIG. 3, the transmission control program 332 performs transmission processing according to the authority in the conventional manner. At that time, in the step similar to step S353, if the video data 370 rather than the imaging data 390 is validated for the relevant authority, the video data 370 prepared in advance is transmitted, not the imaging data 390. In the processing performed by the upload control program 350, when an upload execution event is received in step S401, the data to be uploaded in step S403 is also the video data 370.

In the step similar to step S353 in FIG. 3, the transmission control program 332 performs processing that validates the video data 370 according to the authority without temporarily stopping the upload processing. When the video data 370 is validated, the video data 370 is transmitted without the imaging data 390 being transmitted. At that time, when the upload control program 350 receives the upload execution event in step S401, the data to be uploaded in step S403 is also the video data 370.

The video data 370 can be the immediately-prior imaging data or an image prepared in advance indicating "now setting". By doing so, the video image can be prevented from being uploaded based on the privilege of the administrator using the setting tool while the setting tool is in use.

In the first to third exemplary embodiments, when the setting tool is connected, it is determined whether a video image having a security issue is to be uploaded. However, the present invention is not limited to this configuration. In a fourth exemplary embodiment, even if there is a setting that restricts the view, the processing is configured so that temporary stoppage of the upload processing to the server and uploading of a dummy video transmission are not performed until the restriction is actually exceeded.

The configuration of the system according to the present exemplary embodiment is similar to that illustrated in FIGS. 1 to 5 in the first exemplary embodiment. However, the transmission control program 330 arranged in the primary storage devices 120 and 220 illustrated in FIG. 2 is replaced with a transmission control program 333 (not illustrated).

The flowchart illustrating processing executed by the transmission control program 333 is similar to the flowchart illustrated in FIG. 3 executed by the transmission control program 330 according to the first exemplary embodiment, except that the processing in step S351 is performed in step S350, the processing in step S352 is performed in step S351, and the following processing is performed in step S352.

More specifically, rather than when the setting tool is first connected, the processing proceeds to the processing similar to that performed in step S352 when a video image whose view is not restricted is required and there is a setting restricting imaging which is valid. Then, the transmission control program 333 determines whether actual imaging data 390 includes a video image that needs to be restricted.

For example, for a privacy mask, the transmission control program 333 determines whether a mask is set in the current angle of view. For a visible range restriction, the transmission control program 333 determines whether the current angle of view is beyond the restricted angle of view. If it is determined that the current angle of view is beyond the restricted range, the processing proceeds to the step similar to step S353, and validates the temporary stoppage of the upload processing.

By doing this, a normal video image is uploaded until the setting tool is in use and a privileged video image exceeding the restricted range is used. The uploading of an unintentional video image is prevented only when the video image is actually going to be unintentionally uploaded based on the privilege of the administrator using the setting tool. Further, a dummy video transmission unit for transmitting a designated video image can be provided so that the dummy video image is uploaded when the setting tool is in use.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-234880 filed Oct. 19, 2010, which is hereby incorporated by reference herein in its entirety.

What is claimed is:

1. A monitoring camera comprising:
   a processing unit configured to perform a restriction process for restricting viewing a part of an image to be captured by the monitoring camera;
   a transmitting unit configured to transmit the image data without the restriction process to a privileged client apparatus according to a request from a privileged client;
   a setting unit configured to set a parameter for restricting viewing a part of the image to be captured by the monitoring camera according to an instruction from the privileged client apparatus while image data captured by the monitoring camera without the restriction process is transmitted to the privileged client apparatus;
   a determination unit configured to determine whether the image data captured by the monitoring camera without the restriction process is transmitted to the privileged client apparatus while the parameter for restricting viewing a part of the image to be captured by the monitoring camera is being set; and
   a control unit configured to prevent image data without the restriction process from being uploaded to a server via a network if the determination unit determines that the image data captured by the monitoring camera without the restriction process is transmitted to the privileged client apparatus while the parameter for restricting viewing a part of the image is being set by using the captured image without the restriction process and configured to upload image data captured by the monitoring camera to the server via the network in accordance with an event if the determination unit determines that the image data captured by the monitoring camera without the restriction process is not transmitted to the privileged client apparatus while the parameter for restricting viewing a part of the image is not being set by using the captured image without the restriction process.

2. The monitoring camera according to claim 1, wherein if a predetermined event occurs and the control unit determines to upload the captured image data to the server, the control unit executes uploading to the server.

3. The monitoring camera according to claim 1, wherein the processing unit performs the restriction process on viewing of a part of the captured image data input by an imaging unit by performing mask processing in which privacy mask processing is performed on the captured image data.

4. The monitoring camera according to claim 1, wherein the processing unit performs the restriction process on viewing of a part of the captured image data input by an imaging unit by performing visible range restriction processing in which a visible range is restricted.

5. The monitoring camera according to claim 1, wherein the processing unit performs the restriction process for restricting an imaging range that can be captured by an imaging unit by performing preset limitation processing in which a movable position is limited to a preset position.

6. The monitoring camera according to claim 1, wherein the processing unit performs the restriction process for restricting an imaging range that can be captured by an imaging unit by performing angle of view processing in which an angle of view of the imaging unit is set according to a control instruction to the imaging unit for the angle of view by a client apparatus having an authority to instruct the processing unit to perform the restriction process.

7. The monitoring camera according to claim 1, wherein the processing unit performs the restriction process for compositing and recording a panoramic image with use of captured image data whose privacy mask is invalid.

8. The monitoring camera according to claim 1, wherein the processing unit performs the restriction process toward a plurality of client apparatuses on viewing of a part of the captured image data input by an imaging unit, and
   wherein the control unit stops uploading of the captured image data to the server if the restriction process which restricts at least one client apparatus among the plurality of client apparatuses from viewing the captured image data input by the imaging unit is performed.

9. The monitoring camera according to claim 1, further comprising a notification unit configured to notify a client apparatus of a reason why uploading of the captured image data to the server stopped, when uploading is stopped.

10. The monitoring camera according to claim 1, wherein the control unit controls a transmission unit to transmit designated image data as dummy image data to the server if the processing unit is performing the restriction process.

11. The monitoring camera according to claim 1, wherein the control unit is configured to stop uploading the captured image data to the server if the processing unit performs the restriction process.

12. The monitoring camera according to claim 1, wherein the monitoring camera is connected to a first client apparatus having an authority to instruct the processing unit to perform the restriction process and is connected to a second client apparatus not having the authority, and
   wherein the control unit is configured to stop uploading to the server the captured image data during the processing unit performing, according to the instruction from the first client apparatus, the restriction process.

13. The monitoring camera according to claim 1, wherein the image data uploaded to the server is seen by a user using a client apparatus connected to the monitoring camera.

14. The monitoring camera according to claim 1, wherein the processing unit performs the restriction process for compositing and recording a panoramic image with use of captured image data.

15. The monitoring camera according to claim 1, wherein the determination unit further determines if the image data without the restriction process is required for the privileged client according to the request, the transmitting unit transmits the image data without the restriction process if the request is for setting the parameter for restricting viewing a part of the image, and the transmitting unit transmits image data according to an authority of the privileged client if the request is not for setting the parameter for restricting viewing a part of the image.

16. The monitoring camera according to claim 1, wherein the setting unit invalidates a parameter which has already been set for restricting viewing a part of an image if a flag for preventing image data without the restriction process from being uploaded to a server via a network is valid.

17. A method for controlling a monitoring camera, the method comprising:
   a processing step for performing a restriction process for restricting viewing a part of image to be captured by the monitoring camera;
   a transmitting step for transmitting the image data without the restriction process to a privileged client apparatus according to a request from a privileged client;
   a setting step for setting a parameter for restricting viewing a part of an image to be captured by the monitoring camera according to an instruction from the privileged client apparatus while image data captured by the monitoring camera without the restriction process is transmitted to the privileged client apparatus;
   a determining step for determining whether the image data captured by the monitoring camera without the restriction process is transmitted to the privileged client apparatus while the parameter for restricting viewing a part of the image to be captured by the monitoring camera is being set; and
   a control step for preventing image data without the restriction process from being uploaded to a server via a network if it is determined that the image data captured by the monitoring camera without the restriction process is transmitted to the privileged client apparatus while the parameter for restricting viewing a part of the image is being set by using the captured image without the restriction process and configured to upload image data captured by the monitoring camera to the server via the network in accordance with an event if it is determined that the image data captured by the monitoring camera without the restriction process is not transmitted to the privileged client apparatus while the parameter for restricting viewing a part of the image is not being set by using the captured image without the restriction process.

18. The method according to claim 17, wherein in the control step, if a predetermined event occurs and it is determined to upload the captured image data to the server in the control step, uploading to the server is executed.

19. The method according to claim 17, wherein in the processing step, the restriction process for compositing and recording a panoramic image is performed with use of captured image data whose privacy mask is invalid.

20. The method according to claim 17, wherein in the processing step, the restriction process toward a plurality of client apparatuses on viewing of a part of the captured image data is performed, and
   wherein in the control step, uploading of the captured image data to the server is stopped if the restriction process which restricts at least one client apparatus among the plurality of client apparatuses from viewing the captured image data is performed.

21. The method according to claim 17, wherein in the control step, uploading of the captured image data to the server is stopped if the restriction process is performed in the processing step.

22. The method according to claim 17, wherein the monitoring camera is connected to a first client apparatus having an authority to instruct the monitoring camera to perform the restriction process and is connected to a second client apparatus not having the authority,
   wherein in the control step, stopping uploading to the server the captured image data during the restriction process is performed according to the instruction from the first client apparatus.

23. A non-transitory computer-readable storage medium storing a program for causing a computer to execute:
   a processing step for performing a restriction process for restricting viewing a part of an image to be captured by the monitoring camera;
   a transmitting step for transmitting the image data without the restriction process to a privileged client apparatus according to a request from a privileged client;
   a setting step for setting a parameter for restricting viewing a part of the image to be captured by the monitoring camera according to an instruction from the privileged client apparatus while image data captured by the monitoring camera without the restriction process is transmitted to the privileged client apparatus;
   a determining step for determining whether the image data captured by the monitoring camera without the restriction process is transmitted to the privileged client apparatus while the parameter for restricting viewing a part of the image to be captured by the monitoring camera is being set; and
   a control step for preventing image data without the restriction process from being uploaded to a server via a network if it is determined that the image data captured by the monitoring camera without the restriction process is transmitted to the privileged client apparatus while the parameter for restricting viewing a part of the image is being set by using the captured image without the restriction process and configured to upload image data captured by the monitoring camera to the server via the network in accordance with an event if it is determined that the image data captured by the monitoring camera without the restriction process is not transmitted to the privileged client apparatus while the parameter for restricting viewing a part of the image is not being set by using the captured image without the restriction process.

24. The storage medium according to claim 23, further storing a program for executing uploading to the server in the control step, if a predetermined event occurs and it is determined to upload the captured image data to the server in the control step.

25. The storage medium according to claim 23, further storing a program for executing, in the processing step, the restriction process for compositing and recording a panoramic image is performed with use of captured image data whose privacy mask is invalid.

26. The storage medium according to claim 23, further storing a program for setting, in the processing step, the restriction process toward a plurality of client apparatuses on viewing of a part of the captured image data is performed, and
   stopping uploading of the captured image data to the server in the control step, if the restriction process which restricts at least one client apparatus among the plurality of client apparatuses from viewing the captured image data is performed.

27. The storage medium according to claim 23, further storing a program for executing, in the control step, stopping uploading the captured image data to the server if the restriction process is performed in the processing step.

28. The storage medium according to claim 23, wherein the computer is connected to a first client apparatus having an authority to instruct the computer to perform the restriction process and is connected to a second client apparatus not having the authority, wherein the storage medium further stores a program for executing, in the control step, stopping uploading to the server the captured image data during the restriction process is performed according to the instruction from the first client apparatus.

* * * * *